US005373416A

United States Patent [19]

Tran

[11] Patent Number: 5,373,416

[45] Date of Patent: Dec. 13, 1994

[54] BALLAST HOLDER

[75] Inventor: Michael T. Tran, Oakland, Calif.

[73] Assignee: Peerless Lighting Corporation, Berkeley, Calif.

[21] Appl. No.: 126,803

[22] Filed: Sep. 24, 1993

[51] Int. Cl.5 ................................................ H02B 1/12

[52] U.S. Cl. ............................ G27/674; 174/DIG. 2; 336/68; 336/67; 361/825

[58] Field of Search .................... 174/DIG. 2; 336/67, 336/68; 361/674, 825

[56] References Cited

U.S. PATENT DOCUMENTS 3,024,937 3/1962 Kool ............................ 174/DIG. 2
3,851,225 11/1974 Lachetta ............................ 361/674

*Primary Examiner*—Gregory D. Thompson
*Attorney, Agent, or Firm*—Donald L. Beeson

[57] ABSTRACT

A ballast holder which can be fabricated from a single piece of bent sheet metal material, includes a gusseted riser structure, a base portion extending rearwardly from the foot of the riser structure, and a top flange portion extending in a forwardly direction from the top end of the riser structure for securing one of the mounting flanges of a ballast. The height of the rigid riser structure is chosen to be at least as great as the maximum height of a standard ballast to be held thereby. The ballast holder is used to install a ballast in an inverted position within a lighting fixture housing and can accommodate different sized ballasts. The ballast holder also reduces the amount of structure between the ballast and the overlying reflector element of the lighting fixture and thereby reduces the tendency of the ballast holding structure to bow or distort the lighting fixture's reflector where space is limited.

13 Claims, 4 Drawing Sheets

BALLAST HOLDER

BACKGROUND OF THE INVENTION

The present invention generally relates to electric lighting fixtures, and more particularly to mounting hardware for securing ballasts within the housing of a fluorescent lighting fixture. The invention has particular application in linear indirect lighting fixtures having limited space for mounting a ballast.

Linear fluorescent lighting, which is widely used in offices and other commercial environments, employ ballasts of standard configurations and sizes supplied by a ballast manufacturer. The ballasts normally are provided with mounting flanges that have longitudinal mounting slots for attaching the ballast to the lighting fixture housing, for example, to T-slots extruded into the bottom of the housing. However, space constraints often make this mounting arrangement difficult. For example, in a six-inch round linear indirect fixture, which is a commonly used shape, the side edges of the base of the ballast will often hit the inner cylindrical walls of the fixture housing before the ballast is able to seat against the bottom of the housing. This causes the fixture to ride higher up in the housing and interfere with the fixture's reflector which is mounted over the ballast. To solve this problem, the ballast is frequently inverted such that the narrower top end of the ballast will fit further down into the housing. Heretofore, when such an inverted mounting position has been used, the ballast normally has been held down by a separate metal strap. (This is due to the unavailability of the now inverted ballast mounting flanges.)

The difficulty with using metal straps is that such straps must be pre-formed to fit a ballast of a particular height and length. This increases the number of parts needed for the manufacture of fixtures carrying different ballast sizes. Also, where spaces are confined, the fixture's reflector may contact the top of the ballast and such contact will tend to distort the reflector which optically is undesirable. The strap across the ballast acts to amplify this distortion. A further problem with using a conventional strap is that the ballast also tends to shift underneath the strap during shipment of the lighting fixtures which creates a risk that the ballast will come loose.

Another heretofore known approach to mounting the ballast in an inverted position is to use two partial straps at the end of the ballast. While the partial straps could be adapted to any length of ballast, it could not be adapted to any height. Such straps are also not very strong and create an even greater risk that the ballast will shift in the housing and come loose.

The invention overcomes the above-mentioned drawbacks associated with straps and partial straps for mounting ballast in an inverted position within a lighting fixture housing. The invention provides for a ballast holder which affixes to the ends of the ballast only, which is very stiff so as to prevent shifting and which will accommodate any standard ballast size. Further, the ballast holder of the invention is easy to install and can be inexpensively fabricated from a piece of stamped sheet metal.

SUMMARY OF THE INVENTION

Briefly, the invention involves a ballast holder for securing ballasts having horizontally extending mounting flanges in a flange up, inverted position within a lighting fixture housing. The ballast holder includes a rigid riser structure, a base portion extending rearwardly from the foot end of the rigid riser structure for securing the ballast holder to the bottom of the lighting fixture housing, and a top flange portion extending forwardly of the top end of the riser structure for securing one of the mounting flanges of the ballast. The height of the rigid riser structure is chosen to be at least as great as the maximum height of a standard ballast to be held thereby.

In a preferred feature of the invention, the securement means on the top flange portion of the ballast holder are comprised of channel locking means which capture and hold one of the ballast mounting flanges when the mounting flange is caused to slide into the channel locking means. The channel locking means can be formed by punched tabs in the top flange portion of the holder which extend to the underside of the holder's top flange. By providing two properly spaced punch tabs forming locking channels which face outwardly from the center of the top flange portion, the locking channels can grip each inside edge of the longitudinal mounting slot normally formed in the ballast mounting flange so as to resist lateral displacement of the mounting flanges from the locking channels. Also, by providing locking channels, the ballast can be secured, as hereinafter described in more detail, without the need for attachment hardware such as extra screws. This speeds installation and keeps the number of parts required to a minimum.

The riser structure of the ballast holder is preferably in the form of a vertical transverse support wall with bent back flanges extending rearwardly from the side edges of the support wall to form gussets which increase the rigidity of the structure. The support wall can be additionally provided with dimpled areas to increase structural rigidity.

It will readily be seen that the entire ballast holder of the invention can be fabricated from a stamped sheet metal part which is bent and punched as required.

It is therefore an object of the invention to provide a ballast holder which can be used to mount a ballast in an inverted position to the bottom of a lighting fixture housing and which can flexibly be used with different sized ballasts and specifically with ballast of different lengths and heights. By providing a universal ballast holder, parts inventory can be reduced as can problems associated with having different mounting brackets, and therefore different part numbers, for different ballast configurations. It is a further object of the invention to provide a strong, stable mounting structure for the ballast which will prevent the ballast from shifting in the housing during shipping. It is another object of the invention to provide a ballast holder that minimizes assembly time and reduces the amount of structure between the ballast and overlying reflector element in order to reduce the tendency of the ballast holding structure to bow or distort the lighting fixture's reflector when spaces are confined. Yet other objects of the invention will be apparent from the ballast holder described in the following specification and illustrated in the accompanying drawings.

DETAILED DESCRIPTION OF THE ILLUSTRATED EMBODIMENT

Figure 1:
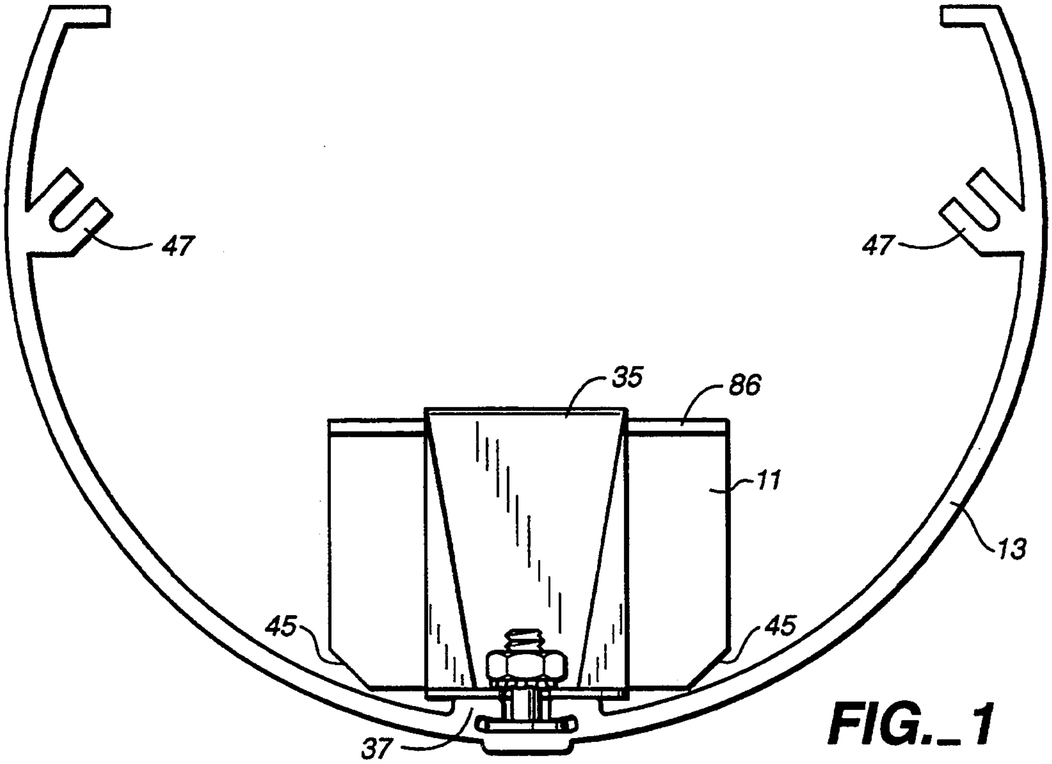
FIG. 1 is a side elevational view of a linear indirect lighting fixture housing having a ballast mounted in an inverted position to the bottom of the housing using a ballast holder in accordance with the invention.
Figure 2:
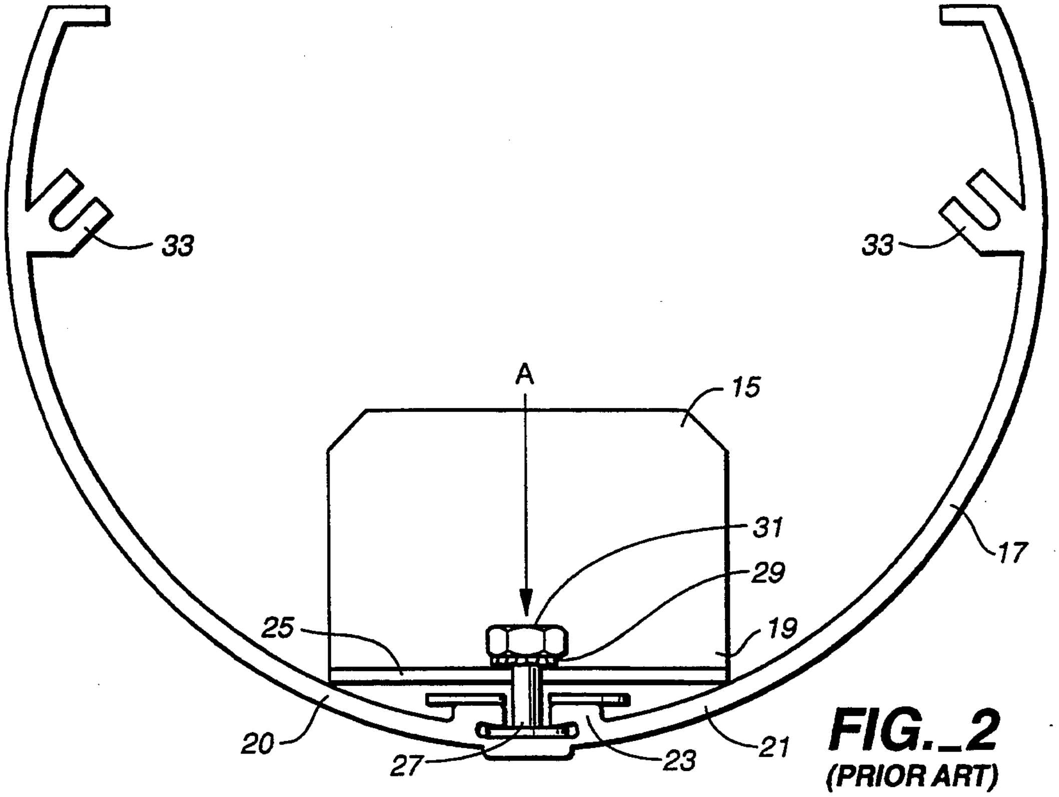
FIG. 2 (PRIOR ART)
FIG. 2 is a side elevational view of a linear indirect lighting fixture housing having a ballast mounted right-side up to the bottom of the housing in a conventional manner.
Figure 3:
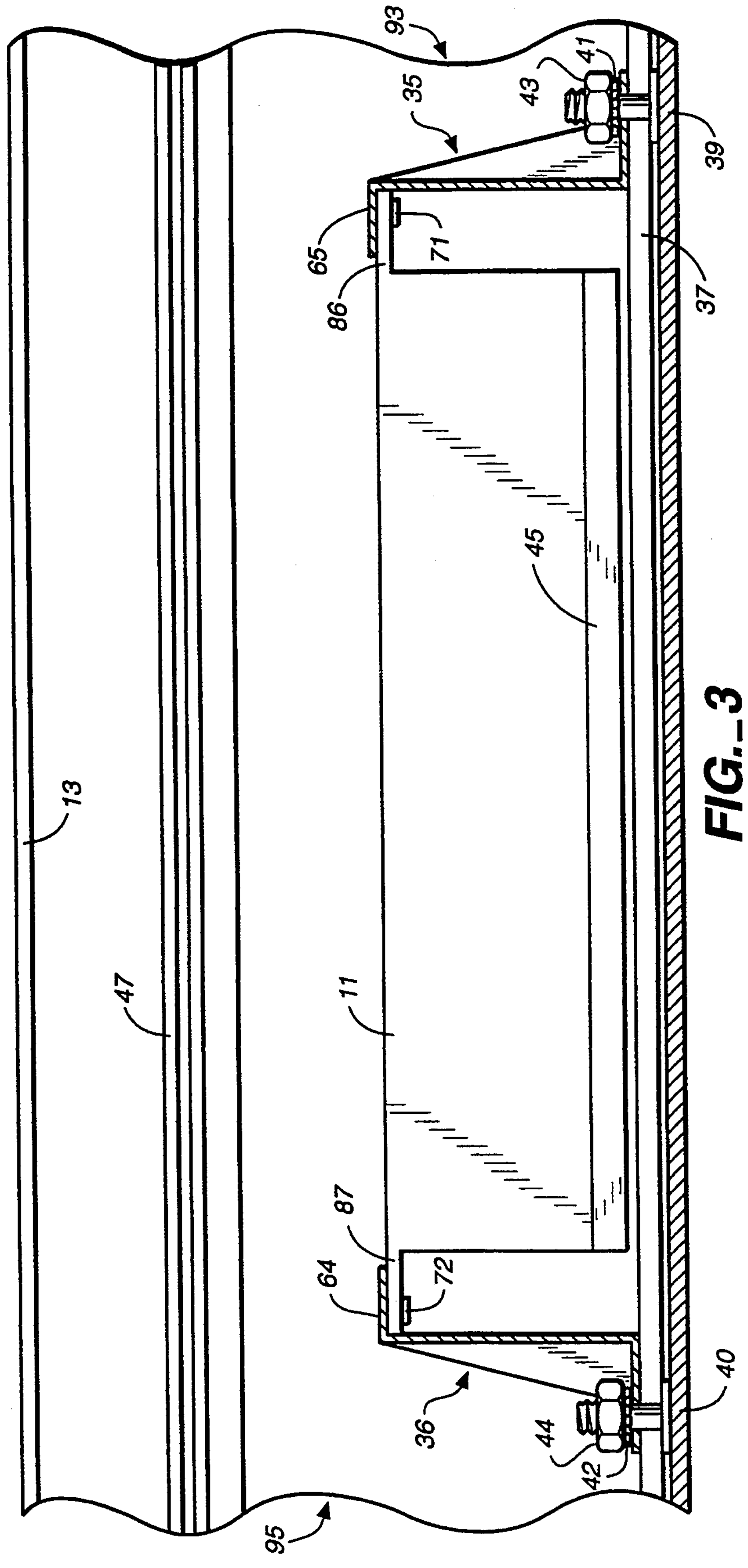
FIG. 3 is a front elevational view in cross-section of the lighting fixture housing, ballast, and ballast holder shown in FIG. 1.

Referring now to the drawings, FIGS. I and 3 show ballast 11 mounted in an inverted position to the bottom of fixture housing 13, whereas FIG. 2 shows ballast 15 mounted in fixture housing 17 in a conventional upright position. In FIG. 2 it can be seen that the base 19 of ballast 15, because of the housing's curvature, rides up on the housing side walls at contact points 20, 21 so as to prevent the ballast from seating on the bottom T-channel 23 to which the ballast flanges, such as flange 25, are secured, such as by T-slot screw 27, lock washer 29, and nut 31. Because the ballast rides up in the housing, there is less room for mounting a reflector from reflector mounting channels 33 overt he top of the ballast. It can further be observed that if the ballast is screwed down too tightly, as denoted by the force vector A, the bottom of the housing, which is typically fabricated of extruded aluminum, will tend to deform at the contact points 20, 21. In FIGS. 1 and 3 on the other hand, the ballast 11 is held at each end in an inverted position by the ballast holders of the invention. Specifically, ballast holders 35, 36 are mounted directly to T-slot 37 by means of T-slot screws 39,40, lock washers 41, 42 and nuts 43,44. Because of the angled surfaces 45 at the top edges of a standard ballast, it can be seen that the ballast is permitted to extend further down into the bottom of the fixture housing without contacting the housing. This will provide a small amount of extra room in which to mount a reflector from the extruded mounting channels 47.

Figure 6:
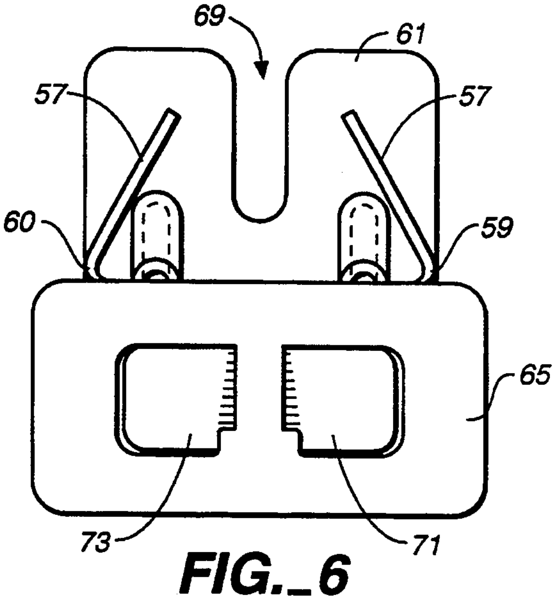
FIG. 6 is a top plan view of the ballast holder shown in FIG. 5.
Figure 7:
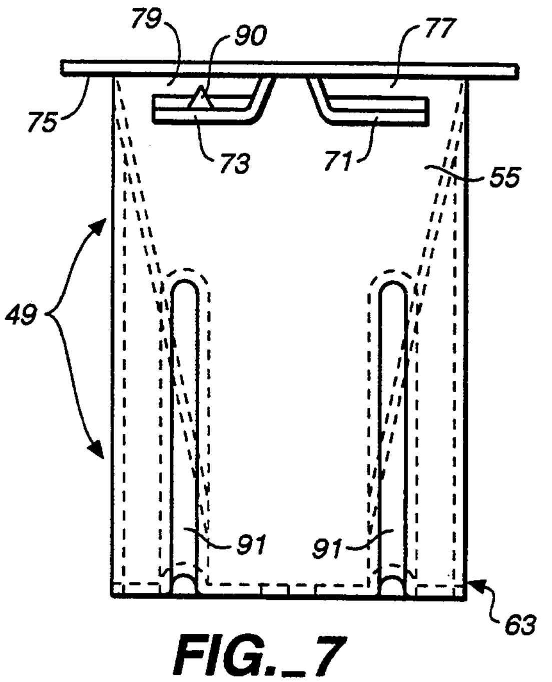
FIG. 7 is a front elevational view thereof.
Figure 8:
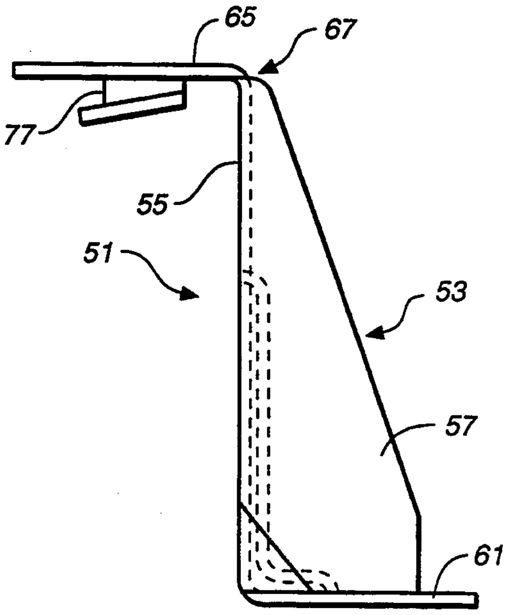
FIG. 8 is a side elevational view thereof.

Referring to FIGS. 6–8, ballast holder 35 has a riser structure 49 having a forward side 51 facing toward the ballast and a rearward side 53 facing away from the ballast. The riser structure is seen to consist of a transverse vertical support wall 55 and gusset members 57 extending rearwardly from the vertical side edges 59, 60 of the support wall. The gussets, which angle inwardly to insure contact with the base portion 61 described below and which vertically extend to the full height of the support wall, increase the ridigity of the riser structure and prevent the riser structure from bending backward in the event a shifting force is imparted to the ballast. More specifically, since a gussetted holder is provided at either end of the ballast, the ballast will be unable to shift longitudinally in either longitudinal direction. Also, as shown in FIGS. 7 and 8, the vertical support wall can be dimpled as shown at 91 so as to provide additional structural rigidity to this wall.

Figure 5:
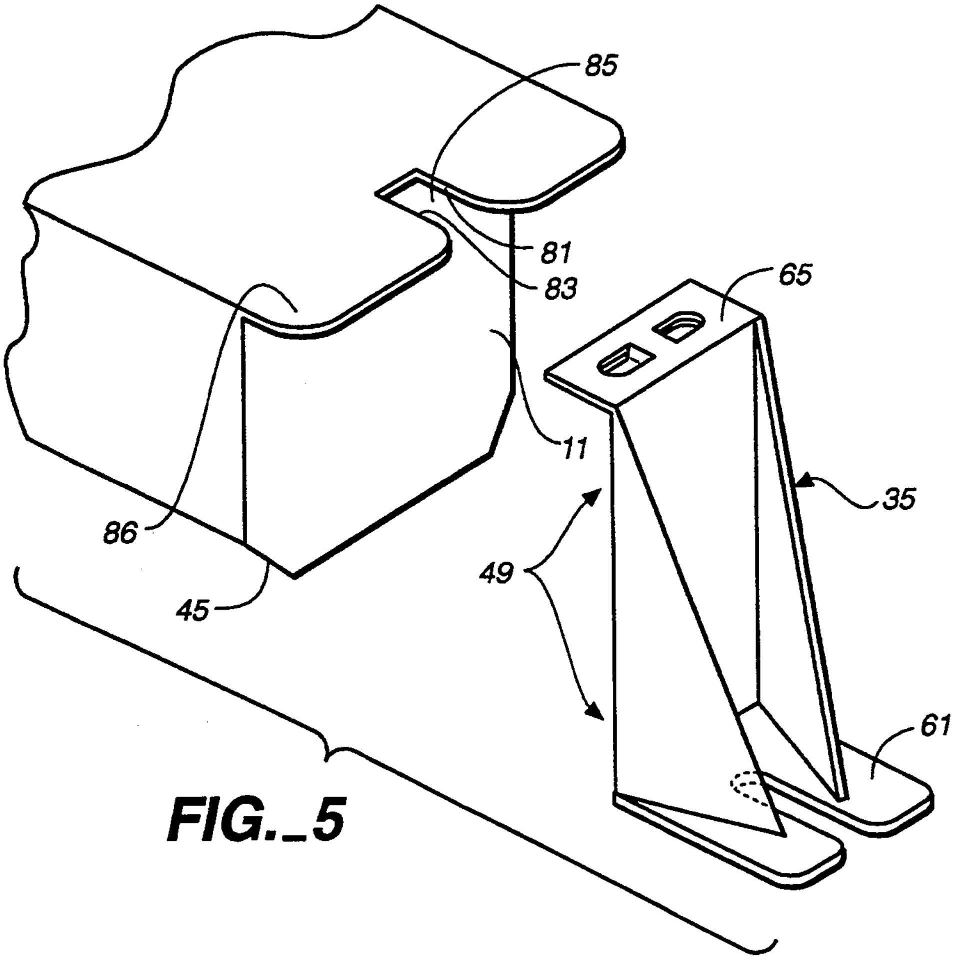
FIG. 5 is a top rear perspective view of a ballast holder in accordance with the invention positioned to engage the mounting flange of a ballast.

The ballast holder further includes base portion 61 extending rearwardly from the foot end 63 of the riser structure, and top flange portion 65 extending forwardly from the riser structure's top end 67. The base portion includes a longitudinal mounting slot 69 for mounting the holder to the housing's bottom T-slot 23. The top flange portion 65, in turn, includes channel lock means in the form of punched tabs 71, 73 which extend parallel to the flange's underside 75 to form outwardly facing looking channels 77, 79 which extend from the center of the flange. As best seen in FIG. 5, the tabs are specifically formed such that the locking channels 77, 79 will grip the inside edges 81, 83 of mounting slot 85 on the ballast mounting flange 86. Engaged in this mounting slot, the locking channels of the top flange portion of the ballast holder will prevent the ballast from moving in a lateral direction, thereby giving the ballast lateral stability as well as longitudinal stability. As seen in FIGS. 7 and 8, the tabs angle slightly inwardly toward support wall 55 to provide a tapered locking channel into which either of the ballast mounting flanges 86, 87 can be firmly wedged. Scarifying point 90 on the interior side of tab 73 will bite into the flange to provide good electrical contact between the ballast and the holder. It is noted that one or more scarifying points could be provided at different locations for this purpose, for example, a point could be provided under each of the tabs 71, 73 and/or on the underside of the bracket's top flange portion 65.

The entire ballast holder of the invention can be fabricated from a stamped metal part suitably using 20 gauge cold rolled steel. The stamped part is formed into the bracket by bends for the base portion and top flange portion of the bracket as well as bends for the gussets. A punching operation for the channel locking tabs would also be required. The bracket may also be fabricated of other materials such as plastic.

Figure 4:
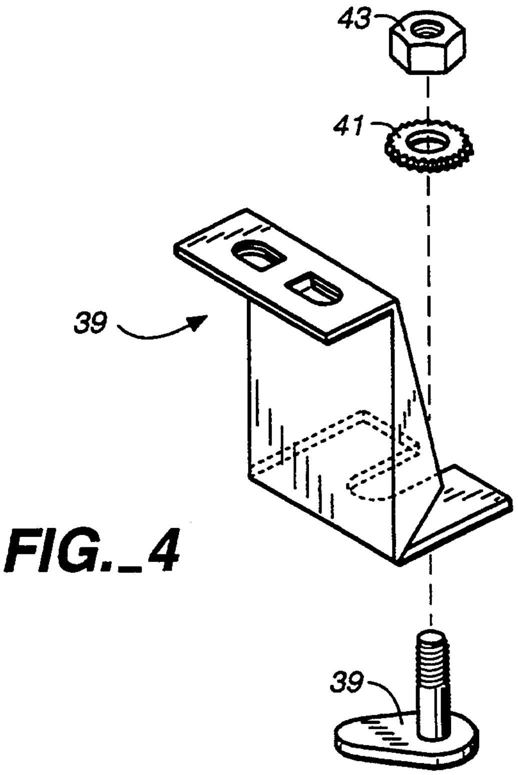
FIG. 4 is an exploded top perspective view of a ballast holder in accordance with the invention and the T-slot screw, lock washer, and nut therefor.

Installation of the illustrated ballast holder is now described with reference to FIGS. 3–5. A ballast 11 is installed using two ballast holders 35, 36 for securing the mounting flanges 86, 87 at either end of the ballast. As a first step, one of the two ballast holders, e.g., ballast holder 35, is mounted at a position along T-slot 37 which properly locates the ballast within the housing. This first ballast holder is secured in place by T-slot screw 39, lock washer 41, and nut 43. The ballast's mounting flange 86 is then secured to the top flange portion 65 of ballast holder 35 by sliding the mounting flange into the locking channels formed by punch tabs 71, 73 so as to engage the interior edges 81, 83 of the flange's mounting slot 85. Once the ballast is secured to this first ballast holder, the second ballast holder 36 is secured to the housing's T-channel 37 at the opposite end of the ballast such that its top flange portion 64 faces toward the ballast to engage the other one of the ballast mounting flanges 87. This ballast holder is moved inwardly along the T-channel while guiding the locking channels formed by the punched tabs 72 on the holder's top flange portion over the ballast mounting flange 87. Once the second ballast holder is in place, it is secured by its respective T-slot screw, locking washer, and nut 40, 42, 44. It is noted that the T-slot screws 39, 40 are engaged in the T-slot channel 37 from the open ends 93, 95 of the extruded housing. (The open ends of the housing are subsequently covered by end caps which are not shown).

By securing the ballast with the ballast holders as illustrated, it can be seen that the ballast is held in an inverted position with the top of the ballast facing toward the bottom of the fixture housing. The height of the riser structures of the ballast holders are selected to accommodate the largest standard ballast for which the ballast holders will be used. It can readily be seen that the ballast holders can be easily adjusted along the length of the T-slot to accommodate ballasts of different lengths. The gussets reinforce the holders to prevent longitudinal shifting of the ballast. Lateral shifting will be prevented by the inherent lateral rigidity of the structure and by the locking channels which prevent lateral movement of the ballast mounting flanges in respect to the top flange portion of the holder.

While the present invention has been described in considerable detail in the foregoing specification and the accompanying drawings, it is intended that the invention not be limited to such detail, except as necessitated by the following claims.

What I claim is:

1. A ballast holder for securing ballasts having horizontally extending mounting flanges in a flange up, inverted position within a lighting fixture housing, said ballast holder comprising a rigid riser structure having a toot end, a top end, a rearward side lacing away from a ballast held thereby, a forward side facing toward said ballast, and a height which is at least as great as the maximum height of a ballast to be held thereby, a base portion extending rearwardly from the foot end of said riser structure for securing said holder to a securement surface within a lighting fixture housing, and a top flange portion extending forwardly from the top end of the said riser structure, said top flange portion having flange securement means for securing a mounting flange of a ballast thereto wherein the ballast is supported from said top flange of said ballast holder.

2. The ballast holder of claim 1 wherein said rigid riser structure includes a vertical transverse support wall and at least one gusset member extending rearwardly from said support wall to enhance the rigidity thereof.

3. The ballast holder of claim 2 wherein said support wall has opposed vertical side edges and said gusset member extends rearwardly from each of said side edges.

4. The ballast holder of claim 3 wherein said gusset members angle inwardly from the side edges of said support wall.

5. The ballast holder of claim 3 wherein said gusset members extend the full height of said riser structure.

6. The ballast holder of claim 1 wherein the flange securement means on said top flange portion includes channel locking means which by sliding engagement capture and hold the mounting flange of a ballast.

7. The ballast holder of claim 6 wherein said channel locking means includes scarifying means for scarifying the mounting flange of the ballast to provide a positive electrical contact therewith.

8. The ballast holder of claim 1 wherein said ballast holder is a unitary part fabricated of stamped and bent sheet metal.

9. A ballast holder for securing ballasts having horizontally extending mounting flanges in a flange up, inverted position within a lighting fixture housing, said ballast holder comprising a rigid riser structure having a vertical transverse support wall, opposed vertical side edges, a foot end, a top end, a rearward side facing away from a ballast held thereby, a forward side facing toward said ballast, and a height which is at least as great as the maximum height of a ballast to be held thereby, a base portion extending rearwardly from the foot of said riser structure for securing said holder to a securement surface within a lighting fixture housing, said riser structure including a gusset member extending rearwardly from each of side edge of said support wall to enhance the rigidity of said support wall, and a top flange portion extending forwardly from the top of said riser structure said base portion, said top flange portion having channel locking means which, by sliding engagement, capture and hold the mounting flange of a ballast.

10. The ballast holder of claim 9 wherein the channel locking means on said top flange portion is comprised of punched tabs in said top flange portion that form locking channels on the underside thereof for receiving the mounting flange of a ballast when said mounting flange is slidably engaged against the underside of said top flange portion.

11. The ballast of claim 10 wherein the locking channels formed by said tabs face outwardly from the center of said top flange portion so as to lockingly engage in an open longitudinal mounting slot of a ballast mounting flange.

12. The ballast holder of claim 10 wherein the underside of at least one of said tabs has scarifying means for scarifying the mounting flange of the ballast to provide a positive electrical contact therewith.

13. The ballast holder of claim 10 wherein said ballast holder is a unitary part fabricated of stamped and bent sheet metal.

* * * * *